B. E. WILSON.

RAILROAD CROSSING.

APPLICATION FILED AUG. 11, 1921.

Reissued June 20, 1922. 15,391.

Inventor

Byron E. Wilson

By Staley & Bowman

Attorney

UNITED STATES PATENT OFFICE.

BYRON E. WILSON, OF MARION, OHIO, ASSIGNOR TO THE EYMON CROSSING COMPANY, OF MARION, OHIO, A CORPORATION OF OHIO.

RAILROAD CROSSING.

15,391. Specification of Reissued Letters Patent. Reissued June 20, 1922.

Original No. 1,321,691, dated November 11, 1919, Serial No. 303,028, filed June 10, 1919. Application for reissue filed August 11, 1921. Serial No. 491,572.

*To all whom it may concern:*

Be it known that I, BYRON E. WILSON, a citizen of the United States, residing at Marion, in the county of Marion and State of Ohio, have invented a new and useful Railroad Crossing, of which the following is a specification.

This invention is a cross-over device for intersecting tracks of railways.

One of the objects of the invention is to provide a cross-over device of simple and economical construction by means of which cars may pass across the rails of either of the intersecting tracks without creating the jar, noise and clatter incident to crossings now in general use. A further object is to provide means whereby the intersection blocks of the cross-over device may be conveniently manipulated by operating devices located on the under side thereof so constructed to permit of the ready disengagement of the parts for repairs and renewal without necessitating the raising of the base or otherwise disturbing the roadbed.

The invention will be hereinafter fully set forth and particularly pointed out in the claims.

Figure 1:
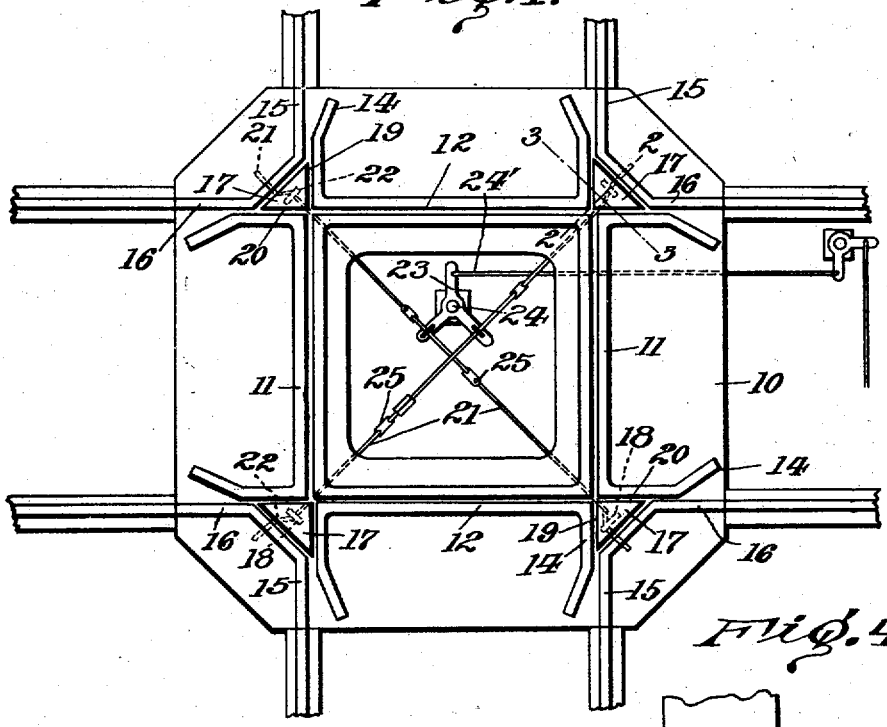
Figure 4:
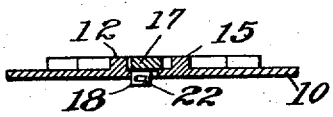
Figure 2:
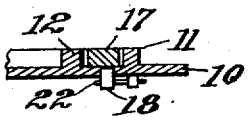
Figure 3:
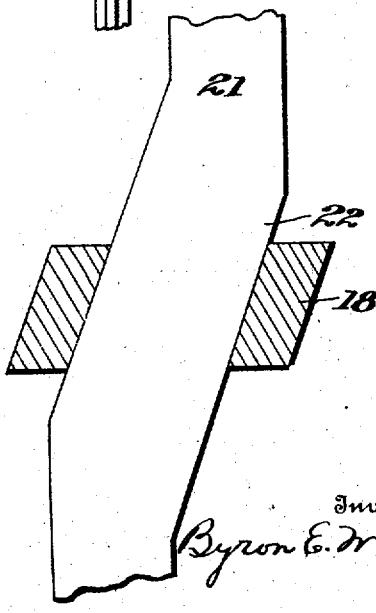

In the accompanying drawing Fig. 1 is a top plan view illustrating a cross-over device constructed in accordance with the invention. Figs. 2 and 3 are sectional views taken at right angles to each other on the lines 2—2 and 3—3 respectively, Fig. 1 illustrating the shiftable intersection blocks. Fig. 4 is a detail view illustrating the connection between an intersection block and its actuating rod.

Referring to the drawing, 10 designates a base provided with cross-over rails 11, and 12, intersecting each other at approximately right angles as shown in the drawing, although the angle may be varied. Each cross-over rail is provided with a groove for the flange of the car wheel, and at the points of intersection, said rails are provided with extensions 14 so disposed as to form angular recesses. Co-operating with the extensions 14 to complete the recesses are rails having branches 15 and 16 connected by an angular portion, the branches 15 forming extensions of the rails 11 and the branches 16 forming extensions for the rails 12. Located within the recesses formed by the extensions 14 are intersection or cross-over blocks 17, free to slide within the recesses, and provided on their undersides with cam receiving lugs 18 which project downwardly through slots in the base 10. Each block is provided with one straight edge 19 to bridge the space between a rail 11 and a branch 15, and a corresponding edge 20 to bridge the space between a rail 12 and a branch 16.

The means illustrated for shifting the blocks 17 consists of two bars 21, passed through and guided by suitable openings in the base 10, and each having an offset portion 22 to provide a two-edged cam portion which is engaged by a cam receiving lug 18 of one of the blocks 17. The bars are guided in their longitudinal movement in any suitable manner, and may be shifted in any desired way, the action being to shift the intersection blocks 17 so that one edge 19 or the other edge 20 of each block is selectively caused to aline itself with its rail 11 and branch 15 or its rail 12 and branch 16 as may be required.

The bars 21 are preferably shifted by a construction such as illustrated in Letters Patent 967,179 to J. H. Eymon, dated August 16th, 1910, consisting of a three armed lever 23 pivoted at 24, and having two of its arms slotted to engage pins on the bars. The third arm is connected by means of a rod 24′ with a suitable operating device.

The construction above described is very similar to that disclosed in the patent to Eymon above referred to. The construction of said patent, while efficient in operation is open to the disadvantage that the operating bars cannot be disconnected from the intersection blocks without raising the base upon which the parts are mounted and otherwise disturbing the roadbed. This objection is overcome in the present invention by making the offset cam portion 22 of each operating bar 21 of substantially greater width than the main portion of the bar, and making the bar in two sections so connected at the points 25 (by nuts and bolts, for instance) as to permit the cam section to be readily separated from the other section. The width of the opening in the cam lug 18 is much greater than the width of the bar 21 beyond either end of the cam portion 22. By reason of this arrangement, the bar may be moved so as to entirely withdraw the cam portion 22 from the opening in said lug, and because the portion of the bar 21 beyond said opening is much narrower than the opening, ample clearance is provided to permit that portion of the bar to be drawn straight through the lug 18, so that the block 17 may be raised without disturbing the base or the surrounding roadbed.

Having thus explained the nature of the invention and described an operative manner of constructing and using the same, although without attempting to set forth all of the forms in which it may be made, or all of the forms of its use what is claimed is:—

1. A railroad crossing of the character described comprising a base, intersecting cross-over rails carried by said base and provided at their points of intersection with recesses, slidable intersection blocks located in said recesses and each having edges positioned to selectively prolong the intersecting rails forming the recess in which it is placed, each block having a cam receiving lug extending through the base, operating bars having angularly disposed cam portions engaging the respective lugs, and means for actuating said bars to shift the lugs, said cam portions of the bars being materially wider than the main portions of the bars, whereby each bar may be disengaged from its intersecting block to permit the latter to be raised.

2. A railroad crossing of the character described comprising a base, intersecting cross-over rails carried by said base and provided at their points of intersection with recesses, slidable intersection blocks located in said recesses and each having edges positioned to selectively prolong the intersecting rails forming the recess in which it is placed, each block having a cam receiving lug extending through the base, operating bars having angularly disposed cam portions extending beneath the base and engaging the respective lugs, and means for actuating said bars to shift the lugs, said bars and lugs having complemental means whereby the bars may be disengaged from the lugs to permit the blocks to be raised.

3. In a railway crossing, the combination of a supporting bed having intersecting rail sections, with a movable intersecting connecting-member, means for sliding same upon said bed, the connection between said operating means and said movable member being located below the bed and comprising cam actuating parts, said parts being so arranged that during the operating movement of the movable member they would be in close contact but would be capable of being moved out of contact for the purpose of permitting the detachment of the operating means from the movable member, substantially as specified.

4. In a railway crossing, a supporting bed having intersecting rail sections, the rails at the point of intersection being interrupted, a movable connecting member located at the point of intersection to prolong either one of the intersecting rails, and operating means, including cam surfaces between the same and the movable members located below the bed, for moving said member from one position to another, the construction and arrangement of said operating means being such as to permit the detachment of the same from said member without disturbing the structure as a whole.

5. In a railway crossing, a supporting bed having intersecting rail sections with the rails at the point of intersection interrupted, a movable block located at the point of intersection on said bed to prolong either one of the intersecting rails, a stirrup on the lower side of said block projecting through said bed, an operating bar having a cam portion to engage the walls of said stirrup to move said block, said bar on one side of said cam portion being narrowed to permit the removal thereof, said stirrup acting to guide said block in its movements and hold the same to said block.

In witness whereof I have hereunto set my hand this 1st day of August, 1921.

BYRON E. WILSON.